(12) United States Patent
Hafellner et al.

(10) Patent No.: US 10,955,313 B2
(45) Date of Patent: Mar. 23, 2021

(54) DUMMY VEHICLE FOR CARRYING OUT TESTS FOR A DRIVER ASSISTANCE SYSTEM

(71) Applicant: 4ACTIVESYSTEMS GMBH, Traboch (AT)

(72) Inventors: Reinhard Hafellner, Spielberg (AT); Martin Fritz, Kobenz (AT)

(73) Assignee: 4activeSystems GmbH, Traboch (AT)

( * ) Notice: Subject to any disclaimer, the term of this patent is extended or adjusted under 35 U.S.C. 154(b) by 310 days.

(21) Appl. No.: 16/315,633

(22) PCT Filed: Jul. 5, 2017

(86) PCT No.: PCT/EP2017/066810
§ 371 (c)(1),
(2) Date: Apr. 4, 2019

(87) PCT Pub. No.: WO2018/007459
PCT Pub. Date: Jan. 11, 2018

(65) Prior Publication Data
US 2019/0257717 A1    Aug. 22, 2019

(30) Foreign Application Priority Data
Jul. 7, 2016 (DE) ................ 10 2016 112 518.0

(51) Int. Cl.
*G01M 17/007* (2006.01)
(52) U.S. Cl.
CPC ............... *G01M 17/0078* (2013.01)

(58) Field of Classification Search
CPC .................................. G01M 17/0078
See application file for complete search history.

(56) References Cited

U.S. PATENT DOCUMENTS

| 3,098,319 A | 7/1963 | Ellis |
| 3,425,154 A | 2/1969 | Lindsey et al. |
| (Continued) | | |

FOREIGN PATENT DOCUMENTS

| CN | 101978250 | 2/2011 |
| DE | 91 03 575 U1 | 10/1991 |
| (Continued) | | |

OTHER PUBLICATIONS

International Search Report for PCT/EP2017/066810.
(Continued)

*Primary Examiner* — Freddie Kirkland, III
(74) *Attorney, Agent, or Firm* — Indiano Law Group LLC; E. Victor Indiano; John T. Woods, III

(57) ABSTRACT

The present invention relates to a dummy vehicle for carrying out tests for a driver assistance system. The dummy vehicle has a deformable first outer panel, which at least partially encloses an inner volume of the dummy vehicle, and an opening element, which at least partially encloses the inner volume of the dummy vehicle, wherein the opening element and the first outer panel form a self-supporting unit. The opening element is detachably connected to the first outer panel such that, upon an influence of an impact force, the opening element is detachable from the first outer panel, such that the self-supporting unit is disintegratable and a deformation of the vehicle is providable.

19 Claims, 7 Drawing Sheets

(56) References Cited

U.S. PATENT DOCUMENTS

Figure 1:
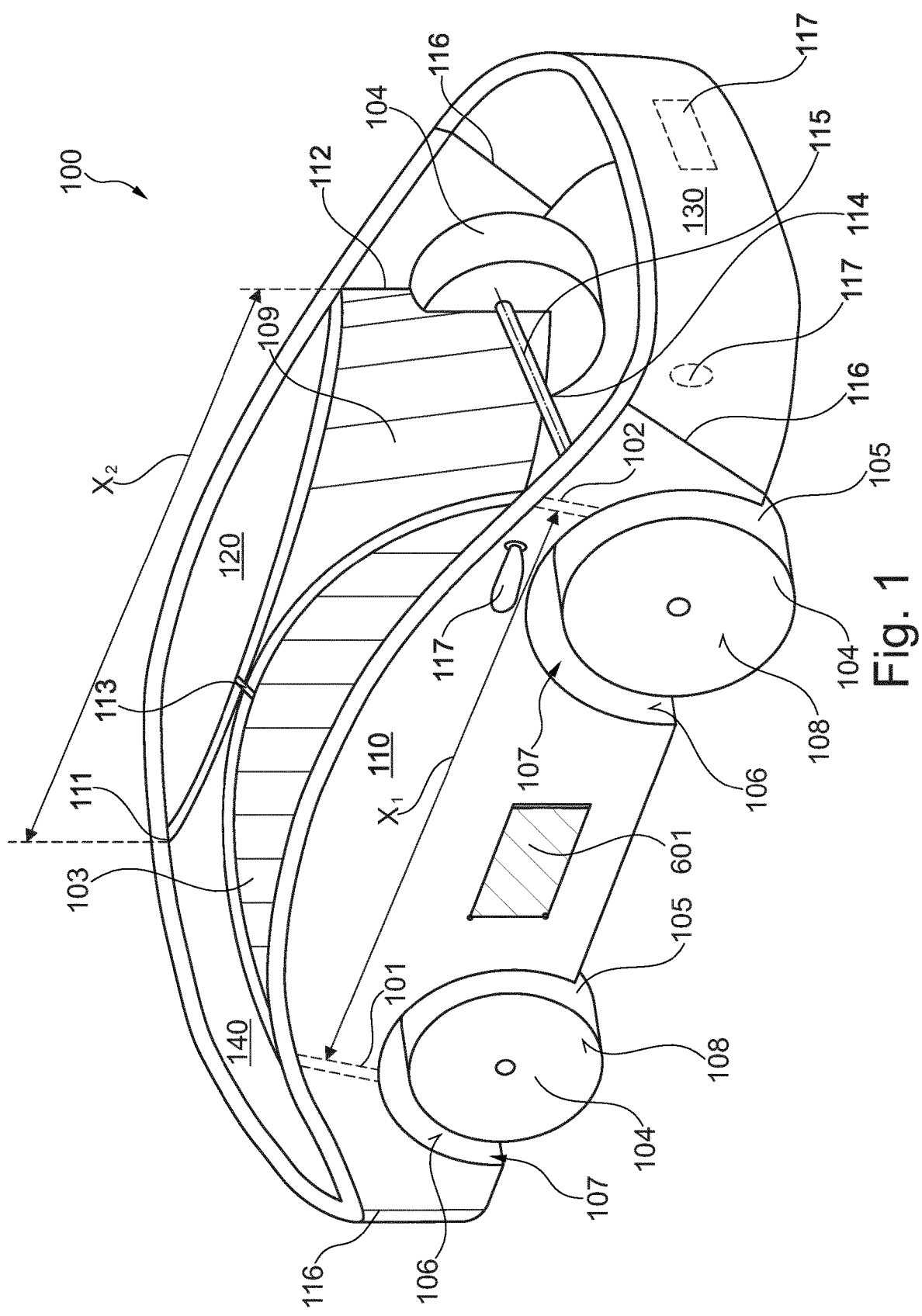

| | | | |
|---|---|---|---|
| 3,557,471 A | 1/1971 | Payne et al. | |
| 3,583,098 A | 6/1971 | Bear | |
| 5,224,896 A | 7/1993 | Terzian | |
| 6,120,343 A | 9/2000 | Migliorati et al. | |
| 8,583,358 B2 * | 11/2013 | Kelly | B60T 7/18 |
| | | | 701/301 |
| 9,182,942 B2 * | 11/2015 | Kelly | B60T 7/18 |
| 9,355,576 B2 | 5/2016 | Fritz | |
| 9,870,722 B2 | 1/2018 | Fritz et al. | |
| 10,697,856 B2 * | 6/2020 | Silberling | B60T 17/221 |
| 2005/0021180 A1 | 1/2005 | Kwon et al. | |
| 2005/0066705 A1 | 3/2005 | Choi | |
| 2005/0155441 A1 | 7/2005 | Nagata | |
| 2006/0075826 A1 | 4/2006 | Roberts et al. | |
| 2010/0078987 A1 | 4/2010 | Lubecki | |
| 2013/0017346 A1 | 1/2013 | Kelly et al. | |
| 2014/0014473 A1 * | 1/2014 | Zecha | G01M 17/0078 |
| | | | 198/617 |
| 2014/0102224 A1 * | 4/2014 | Fritz | G09B 23/28 |
| | | | 73/866.4 |
| 2015/0317917 A1 | 11/2015 | Fritz et al. | |
| 2016/0054199 A1 | 2/2016 | Fritz | |
| 2018/0306676 A1 * | 10/2018 | Wimmer | B62K 25/04 |
| 2019/0219486 A1 * | 7/2019 | Hafellner | F42B 3/113 |

FOREIGN PATENT DOCUMENTS

| | | |
|---|---|---|
| DE | 3901079 | 3/1993 |
| DE | 19802590 | 8/1999 |
| DE | 10 2007 024565 | 2/2008 |
| DE | 102008051233 | 5/2009 |
| DE | 102007035474 | 6/2009 |
| DE | 102008022546 | 11/2009 |
| DE | 102008025539 | 12/2009 |
| DE | 102008030208 | 12/2009 |
| DE | 102011012542 | 2/2011 |
| DE | 102011017146 | 10/2012 |
| DE | 102013214936 | 7/2013 |
| EP | 0034862 | 9/1981 |
| EP | 1010919 | 12/1999 |
| EP | 1734352 | 12/2006 |
| EP | 2192567 | 11/2008 |
| EP | 2 657 672 A1 | 10/2013 |
| FR | 2680902 | 5/1993 |
| GB | 2469932 | 11/2010 |
| GB | 2 496 442 A | 5/2013 |
| JP | 2000-167259 | 6/2006 |
| JP | 2000-039686 | 2/2008 |
| JP | 5429152 B | 12/2013 |
| WO | WO 01/60474 | 8/2001 |
| WO | WO160474 | 8/2001 |
| WO | WO 2009144199 | 5/2009 |
| WO | WO2009103518 | 8/2009 |
| WO | WO2012156484 | 11/2012 |

OTHER PUBLICATIONS

English translation of Abstract of foreign language references from International Search Report.
Patent Office of the People's Republic of China, First Official Action in corresponding case.
International Search Report for PCT/EP2012/059203.
English Translation of Office Action of Japan Patent Office; dated Nov. 1, 2016.
Advanced crash avoidance Tachnologies Program—Final report of the Honda-DRI Team (Dot HS 811 454 A) Jun. 2011.
International Search Report for PCT/EP2013/058,994 (12 pages).
Cited References WO 2012/156484—Translation of DE 102008025539; DE 102007035474.

* cited by examiner

DUMMY VEHICLE FOR CARRYING OUT TESTS FOR A DRIVER ASSISTANCE SYSTEM

CROSS-REFERENCE TO RELATED APPLICATIONS

The present application is a national phase application derived from the international patent application no. PCT/EP2017/066810 filed Jul. 5, 2017, which in turn benefits from the filing date of the German patent application no. DE 10 2016 112 518.0, filed Jul. 7, 2016, both of which are incorporated herein by reference in their entirety.

TECHNICAL AREA

The present invention relates to a dummy vehicle and a method for carrying out tests for a driver assistance system.

BACKGROUND OF THE INVENTION

In modern automotive engineering, more and more assistance systems come into operation, which systems actively monitor the surroundings of a vehicle and passively or actively intervene in the steerage of the vehicle. Therefore, assistance systems have to be subjected to tests to the full extent in order to prevent misjudgements of the assistance systems.

For testing modern assistance systems, collisions or near-collision situations between the vehicle to be tested and a test object, for example a vehicle mock or a dummy, are effectuated. For a collision between a vehicle and a test object, for example, the vehicle or the test object is arranged stationary at a defined position, or also moved travellingly on a platform, and the collision partner is accelerated to a defined difference velocity. In order to effectuate a realistic collision situation (or a situation close to reality), such as for example a collision of two vehicles or of a vehicle with a person in road traffic, both the vehicle and the test object are set in motion in order to generate a collision or a near-collision situation. In doing so, in particular driver assistance systems can be tested close to reality.

For testing the driver assistance systems, a frequent repetition of the tests is necessary. In particular, the construction of a vehicle mock for repeated test manoeuvres is a significant expense factor for such tests for driver assistance systems. A destruction of the vehicle mock upon collisions thus causes costs, in particular upon frequent repetition of collision experiments.

SUMMARY OF THE INVENTION

There may be need to provide a dummy vehicle, which is suitable for a repeated use in tests for driver assistance systems.

This object is solved by a dummy vehicle for carrying out tests for driver assistance systems as well as by a method for carrying out tests for driver assistance systems with a dummy vehicle according to the independent claims.

According to an exemplary embodiment, and according to a first aspect, of the present invention, there is described a dummy vehicle (i.e. a vehicle mock and/or a vehicle target) for carrying out tests (in particular collision tests or near-collision tests) for a driver assistance system. The dummy vehicle has a (e.g. elastically) deformable first outer panel, which at least partially encloses an inner volume of the dummy vehicle, and an opening element, which at least partially encloses the inner volume of the dummy vehicle, wherein the opening element and the first outer panel form a self-supporting unit. The opening element is detachably connected to the first outer panel such that, upon an influence of an impact force, the opening element is detachable from the first outer panel, such that the self-supporting unit is disintegratable (or can disintegrate, or can break up) and a deformation of the vehicle is providable (or can be provided or undergone).

The opening element may in particular, be detachably connected to the first outer panel such that, upon an increase of an air pressure in the inner volume or due to a mechanical deformation due to an impact force of the dummy vehicle, the opening element may be detachable from the first outer panel, such that a pressure equalization between the inner volume and the surroundings (or environment) of the dummy vehicle may be providable.

According to an exemplary embodiment, and according to a further aspect, of the present invention, there is described a method for carrying out tests for a driver assistance system with a dummy vehicle described above.

In tests for driver assistance systems, for example, a test vehicle having a driver assistance system may be tested. The assistance system may have, for example, sensors, such as for example radar sensors, which may recognize an obstacle, such as for example the dummy vehicle described above, and accordingly, may communicate passively or actively with the test vehicle. In such tests, for example, the test vehicle may be moved towards a vehicle mock according to the present invention, wherein both vehicles may have different velocities. Upon a collision of the test vehicle with the vehicle mock, an impact force may be generated. The test vehicle may move, for example, with a velocity of 10 km/h to 100 km/h towards the vehicle mock such that the corresponding impact force upon a collision with the vehicle mock may be generated. The impact energy, from which the impact force may result, can be, for example, in a range between 10 kJ and 1000 kJ.

The vehicle mock (or dummy vehicle) according to the present invention may be, for example, a vehicle in the form of a passenger vehicle or a heavy goods vehicle.

The test vehicle having the assistance system to be tested may be, for example, a motorcar, a passenger car, a heavy goods vehicle, or a motorcycle.

DESCRIPTION OF FURTHER EXEMPLARY EMBODIMENTS

The dummy vehicle may consists of plural outer panels, which together may describe a closed outer shell of the dummy vehicle. The outer panels and the one or the plural opening elements may enclose an inner volume of the dummy vehicle. The outer panels may be formed deformably. This may mean that upon an impact (or a crash) of the dummy vehicle with another test object, the outer panels can be deformed non-destructively. Herein, an outer panel can be painted (or lacquered) on the outer surface, which may be oriented in the direction of the surroundings of the dummy vehicle, in a desired car colour. In particular and as it is described below, an outer panel and the one or the plural opening elements can consist of a laminar structure, wherein an outer layer may represent a desired lacquered, in particular imbued, outer layer of the outer panel or of the opening element. In particular, the outer panels can be elastically deformable and thus can deform themselves back into the starting position after an impact, in which the outer panels may be deformed elastically. Furthermore, for a realistic simulation of a car body, the outer panels may have metal webs (or webbings) in order to simulate realistically (or close to reality) the material properties of a metallic car body. This may be relevant for example in tests of driver assistance systems having radar sensors. Furthermore, the deformable outer panels and the one or the plural opening elements may have a sufficient stiffness, such that no vibrating and/or fluttering of the panels due to a headwind (or fair wind) or due to road irregularities (or bumps) upon movement of the dummy vehicle may be generated.

Due to the deformation of the dummy vehicle after an impact (or a crash), the opening element may open and thus may disintegrate the self-supporting structure of the dummy vehicle. Due to the disintegration (or breaking up) of the self-supporting structure, the individual components of the dummy vehicle, such as for example the outer panels and the opening elements, may be movable (deformable) relative to each other. In particular, the outer panels may remain connected to each other after the disintegration of the self-supporting structure and can deform relative to each other due to a flexible connection. The opening element can, after the opening, remain attached to a region at the corresponding outer panel or can detach completely from the outer panels.

According to a further embodiment example, the outer panel and the opening element and/or panel, in particular the roof panel, may be coupled, such that in a closed state, in which the panel and the outer panel may prevent a pressure equalization between the inner volume and the surroundings of the dummy vehicle, the outer panel and the panel may form a self-supporting structure, and such that in an open state, in which the panel and the outer panel may provide a pressure equalization between the inner volume and the surroundings of the dummy vehicle, the outer panel and the panel may form a deformable structure.

As long as the self-supporting structure composed of outer panels and opening elements is closed, the dummy vehicle may be inherently stable (or dimensionally stable) and e.g. wind-resistant. Due to the collision energy, the force or the overpressure may result in an opening of the opening element, and the structure may become weak, because the stiffness and/or the deformability of the outer panels may individually act, and the outer panels and the opening elements may be deformable relatively to each other. Thus, there may occur a transition of the stiffness of the structure (i.e. the se-supporting unit) to a significantly weaker stiffness of the panels (the shell).

Due to the deformation of the individual outer panels after an impact, the inner volume of the dummy vehicle may change, such that there may result an overpressure or an underpressure, which may destroy components of the dummy vehicle. In addition, an according underpressure or overpressure may falsify the simulation results, because deformations of the outer panels relative to each other and to the opening element may be suppressed, if no pressure equalization with the surroundings occurs. For this reason, the opening element may be detachably connected to the outer panel, so that such an opening may be provided. Upon exceeding for example an overpressure of for example more than 0.01 bar to 0.5 bar, the opening element may detach, such that a pressure equalization connection may be available between the inner volume and the surroundings of the dummy vehicle. Thus, in particular damages due to unfavorable pressure conditions in the inner volume may be reduced. The opening element panel may represent, beside a roof panel, which may form a roof of a dummy vehicle, also a bottom panel or a side panel of the dummy vehicle.

According to a further embodiment example of the dummy vehicle, the opening element may form a panel, in particular a roof panel. According to a further embodiment example of the dummy vehicle, the panel may be formed deformably (in particular elastically deformably). The panel may consist for example of the layer structure described below. Furthermore, the panel may consist of a plastic material.

According to a further embodiment, the opening element may be coupled to a safety slide fastener. In a safety slide fastener, interruption elements may be introduced, for example, at defined distances, for example after 50 centimeter, which may disturb the indentation of the slide fastener. In this way, a selective target-opening can be integrated in the slide fastener, such that, upon being given of a defined pressure in the inner volume, the slide fastener may open.

According to a further embodiment example, the opening element may be coupled by a hook-and-loop fastener, a safety slide fastener, a button connection and/or a hook connection.

According to a further exemplary embodiment, the dummy vehicle may have an elastically deformable supporting panel, which may be arranged in the inner volume of the dummy vehicle. The supporting panel may have a first coupling region and a second coupling region, which may be spaced at a distance from the first coupling region. The first coupling region and the second coupling region may be coupled to the first outer panel, such that upon a changing (in particular upon a shortening) of a first distance between the first coupling region and the second coupling region, the supporting panel may be preloadable.

According to the method, the supporting panel may be preloaded by changing (in particular by shortening) the first distance between the first coupling region and the second coupling region due to a deformation of the first outer panel due to a collision of the dummy vehicle with a test object. Due to the preload of the supporting panel, an initial shape of the first outer panel and the supporting panel may be re-established.

Elastically deformable supporting panels may be arranged in the inner volume of the dummy vehicle. An elastically deformable supporting panel may be fixed to an according outer panel. At this time, the supporting panel may be fixed to the outer panel by a first coupling region and a second coupling region, which may be spaced with a first distance. The first coupling region and the second coupling region of the elastically deformable supporting panel may form, for example, edge regions of the supporting panel.

Herein, the supporting panels and the outer panels may be formed such that each of the panels may be formed self-supportingly. In particular, the outer panels and the supporting panels may be formed stiffly, so that these may form, in a mutual combination, the self-supporting unit, i.e. the dummy vehicle. This self-supporting unit can, for example, be placed on a ground without resulting in further deformations. In other words, in an unloaded state, in which the dummy vehicle may stand on the ground, the first distance and/or generally the distances between the coupling regions may remain constant.

Furthermore, the bottom region of the dummy vehicle may be left open or may be covered by a further bottom panel or by a web, such that the inner volume of the dummy vehicle may be completely enclosed.

The distance between the first coupling region and the second coupling region may be the shortest distance between the nearest located points of the two coupling regions.

The expression "elastically deformable" may be understood such that the supporting wall may change its shape under an influence of an impact force, and may return non-destructively into its original shape upon discontinuation of the acting impact force.

Herein, the supporting panel may be a plane element, which may have a significantly greater length and width than a thickness. The supporting panel may, for example, be formed in a flat area. This may mean that the supporting panel, in a non-deformed and a non-preloaded state, may be formed within a plane, i.e. as a straight plane element. In an exemplary embodiment that is described below, the supporting panel may be given archedly (or dome-shaped) in a non-deformed and a non-preloaded state.

The supporting panel may be formed, for example, from a sandwich construction or as a laminar structure as is described in more detail below. The supporting panel may consist, for example, of a plastic material, in particular a fiber-reinforced, for example glass fiber or carbon fiber reinforced, plastic material.

Furthermore, the supporting panel may consist of a foam material. The supporting panel may have an E-module of 0.01 to 2 MPa.

During a collision of the dummy vehicle, a high impact energy may act on the outer panels. These may begin to deform in order to absorb the shock of collision on the one hand and in order to simulate a realistic collision with real vehicles on the other hand. Due to the formation of the outer panels, the distances between the first coupling region and the second coupling region may change respectively (i.e. the first distance is elongated or shortened). This in turn may result in a preload (or pre-tension) of the elastic supporting panel. After the impact, the supporting panel may deform back into its initial position and may push or may draw the first coupling region and the second coupling region in the initial shape, such that the first distance between the first coupling region and the second coupling region may be given again. At this time, the outer panel may be brought again into its starting shape and may be, for example, strained again.

With the dummy vehicle according to the present invention, there may thus be established a vehicle mock, which can withstand a plurality of collision experiments. On the one hand, the deformable outer panels and supporting panels may absorb an impact force and damp the latter due to the deformation of the corresponding panels. On the other hand, after the collision, in which the outer panels and the supporting panels are momentarily present in a deformed state, they may be rapidly formed back in the undeformed starting shape such that the vehicle mock can rapidly be furbished up again for a further test.

According to a further embodiment example, the first coupling region and the second coupling region may be coupled to the first outer panel such that, upon presence (or being given) the first distance, the supporting panel may be given in an arched (or dome-shaped) profile shape.

An arched profile shape may be understood such that the supporting panel may not extend parallel, i.e. along a straight plane, but that exclusively the edge regions, in which, for example, the respective coupling regions may be formed, may run within a common plane, while a central region of the supporting panel may run out of this common plane. An arched profile shape may, for example, have a determined radius of curvature, which may define the distance between the plane and the apex (or peak) of the arched profile shape. By utilizing of an arched supporting panel, more homogeneous deformation properties can be adjusted.

According to a further embodiment example, the first outer panel may have a connection device, in which the first coupling region or the second coupling region may be attachable. The connection device may represent, for example, a detachable connection device. For example, the connection device may represent a slide fastener system, a button system, or a hook-and-loop system. Furthermore, also non-detachable connection devices may be provided. At this time, for example, adhesive bonds or welded joints can be applied as the connection device.

According to a further embodiment example, the connection device may be formed as a receiving opening, in particular as a slit, in the first outer panel, such that the first coupling region or the second coupling region may be insertable into the receiving opening. In an exemplary embodiment, an edge of the supporting panel may form a coupling region. This edge may, for example, be inserted into the slit, which may be formed in the outer panel. The slit may have in particular an extension direction into the outer panel, which extension direction may not run parallel to a distance direction, along which the first distance may be measured. This may result in that upon changes, it particular upon a prolongation of the first distance of the corresponding coupling regions, the supporting panel and/or its coupling region may not be pulled out of the silt. Upon a change of the distance, thus, a corresponding deformation force may be transferred from the outer panel to the coupling region and accordingly to the supporting panel.

According to a further embodiment example, the first coupling region and/or the second coupling region may have a greater panel thickness than a panel region of the supporting panel between the first coupling region and the second coupling region. Thus, the robustness of the supporting panel may be increased, because peak forces may be transferred in particular to the coupling region.

According to a further embodiment example, the supporting panel may be formed such that, upon being given the first distance, the supporting panel may be preloaded. For example, the supporting panel may represent a plane element, which may run along a plane. By shortening the distance of the coupling regions, the supporting panel may arche (or curve). In this arched state, the coupling regions can be fixed to corresponding connection devices on the outer panel such that, already upon being given the first distance between the first coupling region and the second coupling region, the supporting panel may be given preloadedly (or in a preloaded state). Thus, already in the non-loaded state, the supporting panels may contribute to a reinforcement and a stabilization of the outer panel, because due to the preload of the supporting panel may try, for example, to push the coupling regions away from each other, and thus a region of the outer panel between the coupling regions may be strained.

According to a further embodiment example, the supporting panel may have a bearing region for bearing on a ground, wherein the bearing region may be formed such that a gravitational force (or weight force) of the first outer panel and the supporting panel may be transferable to the ground. In particular, the first outer panel may be formed such that, upon bearing of the supporting panel on the ground, the first outer panel may be free from a force-transmitting coupling to the ground.

The bearing region may, for example, be formed by a lower bottom edge of the supporting panel. For example, also knuckle feet may be arranged at the bearing region. Furthermore, the bearing region may have attachment means, by which a connection, for example to a movable platform for moving the dummy vehicle, can be established. The platform may move freely and may be programmed freely. Furthermore, the platform may be driven by a belt drive.

The bearing region may be formed in particular in a bottom plane. In contrast to this, for example, a lower edge of the outer panel may form a distance to this bottom plane, such that a transmission of the gravitational force to the bottom plane may be prevented. Accordingly, the total gravitational force, that is the gravitational force of the outer panels as well as the supporting panels, may be led via the supporting panels themselves into the ground. Thus, the risk that the outer panels deform due to the bearing on a ground may be reduced.

According to a further embodiment example, the outer panel may be formed of a layer structure. The layer structure may have in particular a deformable foam rubber layer, which may at least partially enclose the dummy vehicle with an inner side. In addition or alternatively, the layer structure may have in particular a deformable outer layer, which may be fixed to an outer side of the foam rubber layer opposite to the inner side. The deformable outer layer may be in particular non-transparent and reflects impinging light waves.

The foam rubber layer may have, for example, a thickness of from 20 mm to 100 mm and a density of from 15 kg/m$^3$ to 60 kg/m$^3$. For a thickness of approximately 20 mm, preferably, a foam rubber material having a density of approximately 60 kg/m$^3$ may be used. For a thickness of approximately 100 mm, preferably, a foam rubber material having a density of approximately 15 kg/m$^3$ may be used.

The foam rubber layer may for example consist of polyurethane. Furthermore, the foam rubber layer may be reinforced with glass fibers or carbon fibers. The foam rubber layer may furthermore be formed deformable. In an exemplary embodiment, the foam rubber layer may in particular be elastically deformable.

According to a further embodiment example, an adhesive layer may be arranged between the foam rubber layer and the outer layer. The adhesive layer may be formed, for example, of an adhesive foil, which may have, for example, a layer thickness of about 20 μm (micrometer) to about 0.5 mm (millimeters). The density of the adhesive foil may amount, for example, to about 0.9 kg/dm$^3$ to about 2.5 kg/dm$^3$.

According to a further embodiment example, the outer layer may have a reflection coefficient between 60% and 80% with respect to light having a spectral range of from 700 nm to 900 nm, in particular infrared light. In other words, the outer layer may reflect infrared light by at least 60% to 80%. Thus, infrared sensors of the driver assistance system may be measured.

The outer panels may be connected, for example, by connection means that are described precisely below. In a preferred embodiment, these connection means may be fixed to edge regions of the outer layer. For example, the connection means may be a slide fastener system, a button system, or a hook-and-loop system. Furthermore, also non-detachable connection means may be provided. At this time, for example, adhesive joints or welded joints may be applied as the connection device. Furthermore, a hinge-joint, for example made of metal or plastic material, may be applied as the connection means, such that the outer panels may deviate (or pivot) relative to each other. Generally, the connection means may be formed such that, upon an impact the outer panels, may not detach from each other, however, may be deformed, pivoted and/or bended relative to each other.

According to a further embodiment example, the layer structure further may have a deformable functional layer between the foam rubber layer and the outer layer. The functional layer may have in particular a heatable layer, a layer of metal components, in particular of a metallic web (or webbing), and/or an infrared light-reflecting layer.

If the functional layer may be formed heatably, then, for example, the operation of an engine and/or its heat radiation may be simulated in the region of an engine compartment of the tummy vehicle. If a metallic web is used as the functional layer in the layer structure, the radar reflectivity may thereby be increased, such that radar sensors of the driver assistance system may be tested. Accordingly, infrared sensors of the driver assistance systems may be tested, if the functional layer has an infrared light-reflecting layer. A layer structure may have, for example, a functional layer or a plurality of functional layers having the different functions mentioned above.

According to a further embodiment example, the first outer panel may have a wheel section, wherein the wheel section may have a round running notch, which may confine a wheel section of the first outer panel from a section of the first outer panel, which section may enclose the wheel section.

Thus, the wheel section may be delimited by the notch from the surrounding section of the outer panel. The wheel section may represent an integral component of the outer panel, and may, for example, be produced by milling the notch. Alternatively, the wheel section may represent a separate element and may be fixed to the outer panel. The wheel section may, for example, have a cylindrical shape, and may be fixed as a separate component part to the outer panel. One wheel section or a plurality of wheel sections may be formed on a corresponding outer panel.

According to a further embodiment example, the wheel section may have a peripheral surface, and the enclosed section may have a confining surface, wherein the peripheral surface and the confining surface may face each other and may be spaced at a distance from each other by the notch. The confining surface may have in particular a metallic surface layer, and the peripheral surface may have in particular a light-absorbing surface layer, in particular a rubberized surface layer. Thus, the confining surface of the outer panel may form a wheel house of the dummy vehicle. The peripheral surface thus may form, the tyre area of the wheel section.

According to a further embodiment example, the wheel section may have an outer surface, wherein the outer surface may have a further metallic surface layer. The further metallic surface layer may have a pattern, which may in particular be indicative for an arrangement of wheel rim spokes. The outer surface may in particular be that area, which may adjoin to the peripheral surface of the wheel section. The outer surface may have a radial outer edge area, which may have a light-absorbing material, in particular a rubberized layer. For example, the metallic surface layer may be formed in the center of the outer surface, which may be enclosed by the radial outer edge area. The pattern of the metallic surface layer may be indicative for a spoke pattern of a real wheel rim. In particular, the center of the outer surface may be formed oy a replaceable metal cylinder, which may form, for example, a wheel rim of a dummy vehicle.

According to a further embodiment example, the wheel section may be formed rotatable relatively to the first outer panel. For example, a driving motor, which may rotate the wheel section, may be arranged for this purpose. Furthermore, the wheel section may be moved by moving the dummy vehicle along the ground and the wheel section having contact to a ground surface. In this way, the radar sensors of the driver assistance system may measure microdoppler effects of the rotating wheel section. This may improve the conformity with reality of the simulation of the dummy vehicle.

According to a further embodiment example, the dummy vehicle further may have a deformable second outer panel, which at least partially may enclose the inner volume of the dummy vehicle. The opening element, the first outer panel and the second outer panel may form the self-supporting unit, wherein the opening element may detachably connected to the second outer panel such that, upon an influence of an impact force, the opening element may be detachable from the second outer panel such that the self-supporting unit may be disintegratable and a deformation of the vehicle may be providable.

After the test/crash, a total structure, which may be linked up (or stuck close) to a far extent, may remain preserved at least between the first outer panel and the second outer panel. For re-erecting the dummy vehicle, only the opening elements may have to be closed again and the outer panels may have to be aligned relative to each other, whereby a significant advantage in terms of time may be provided for the carrying out of repeated tests.

According to a further exemplary embodiment, the dummy vehicle may have a further supporting panel, which may be arranged in an inner volume of the dummy vehicle. The further supporting panel may have a further first coupling region and a further second coupling region that may be spaced at a distance from the further first coupling region. The further first coupling region and the further second coupling region may be coupled to the second outer panel such that, upon changing of a second distance between the further first coupling region and the further second coupling region, the further supporting panel may be preloadable.

By the embodiment example mentioned above, it is pointed out that a plurality of further outer panels with corresponding supporting panels may enclose an inner volume and thus may form the dummy vehicle. For example, the outer panel may be a left half of the car body and the second outer panel may be a right half of the car body of the dummy vehicle. The second outer panel may have the same embodiment examples and/or features as the first outer panel described above. Furthermore, the further supporting panel may have the same features as the supporting panel described above. Alternatively, the first outer panel may correspondingly replicate (or simulate) a complete car body, without the first outer panel being dividable into further outer panels.

According to a further embodiment example, the supporting panel and the further supporting panel may be fixed to each other in a coupling section. For example, the supporting panel and the further supporting panel may be fixed by a detachable connection at a coupling section. The coupling section may form a section, in which the supporting panels contact, for example. In this coupling section, the supporting panels may be fixed with each other, for example, by a cord connection, a hook-and-loop tissue connection or a button connection.

According to a further embodiment example, the dummy vehicle may have a reinforcement bar, wherein the reinforcement bar may be fixed between the first outer panel and the second outer panel such that a pressure force may be transferable to the reinforcement bar. The reinforcement bar thus may ensure a minimum distance between two outer panels. Furthermore, the reinforcement bar may serve for stiffening the vehicle such that it may be more robust and forms a self-supporting unit. The reinforcement bar may form, for example, a metal bar or a fiber-reinforced plastic material bar.

In a preferred embodiment, the reinforcement bar may be arranged between two opposite wheel sections of opposing outer panels. The reinforcement bar thus may run along an imaginary wheel axis of the dummy vehicle.

The reinforcement bar may further be fixed to a ground (or bottom) and/or to a movable platform by an attachment device. For example, the attachment device may form a magnet attachment, a hook-and-loop fastener, or a hook mechanism.

According to further embodiment example, at least the first outer panel or the second outer panel may have a receiving opening, into which the reinforcement bar may be detachably insertable. At this time, the receiving opening may be formed such that the reinforcement bar can be inserted thereinto and abuts, for example at an abutment at a specified depth of the receiving opening. If the outer panels detach from each other due to an impact and/or if the distance between the two outer panels increases, then the reinforcement bar may slide out of the receiving opening, and a corresponding further deformation of the outer panels may be enabled.

According to a further embodiment example, the dummy vehicle may have a tie element (or pull element), in particular an elastic tie element, wherein the tie element may be fixed to the first outer panel and/or the second outer panel and the reinforcement bar such that the tie element may transmit tensile forces between the first outer panel and/or the second outer panel on the one hand and the reinforcement bar on the other hand. For example, the reinforcement bar may be formed as a hollow profile, wherein the tie element may run in the interior of the hollow profile. The tie element may represent, for example, an elastic rope, such as for example an elastic expander. In this way, for example, the outer panels may depart from the reinforcement bar during an impact, such that the reinforcement bar may detach from the corresponding outer panel, however, a remaining connection between the reinforcement bar and the outer panel may be ensured via the tie element. Thus, the re-assembling of the dummy vehicle in the original state may be simpler, because the reinforcement bar may not detach arbitrarily from the corresponding outer panel.

According to a further embodiment example, the dummy vehicle may have a deformable third outer panel, which may at least partially enclose the inner volume of the dummy vehicle. The third outer panel may be connected to the first outer panel and the second outer panel, wherein the third outer panel may form in particular a front area of the dummy vehicle.

According to a further embodiment example, the dummy vehicle may have a deformable fourth outer panel, which may at least partially enclose the inner volume of the dummy vehicle. The fourth outer panel may be connected to the first outer panel and the second outer panel, wherein the fourth outer panel may form in particular a rear area of the dummy vehicle.

The third and the fourth outer panel may have the same features and designs as the first and the second outer panels described above. Herein, the third and the fourth outer panels may be fixed and stiffened by corresponding supporting panels. Alternatively, the third and the fourth outer panel may be arranged without coupling to a supporting panel. For example, the third outer panel and the fourth outer panel may be connected between the first and the second outer panel. The third outer panel may form, for example, a front area, for example a bumper bar, of a dummy vehicle. The fourth outer panel may have, for example, a rear area, for example a rear bumper bar, of a dummy vehicle.

It is pointed out that the embodiments described herein may represent only a limited selection of possible embodiment variants of the invention. Thus, it possible to combine the features of individual embodiments in a suitable manner, such that a plurality of different embodiments is to be considered as obviously disclosed for the skilled person by the explicit embodiment variants herein. In particular, some embodiments of the invention are described herein by device claims and other embodiments of the invention by method claims. The skilled person will, upon reading this application, recognize immediately that unless it is explicitly stated differently, in addition to a combination of features, which belong to one type of invention object, also an arbitrary combination of features, which belong to different types of invention objects, are possible.

SHORT DESCRIPTION OF THE DRAWINGS

Figure 2:
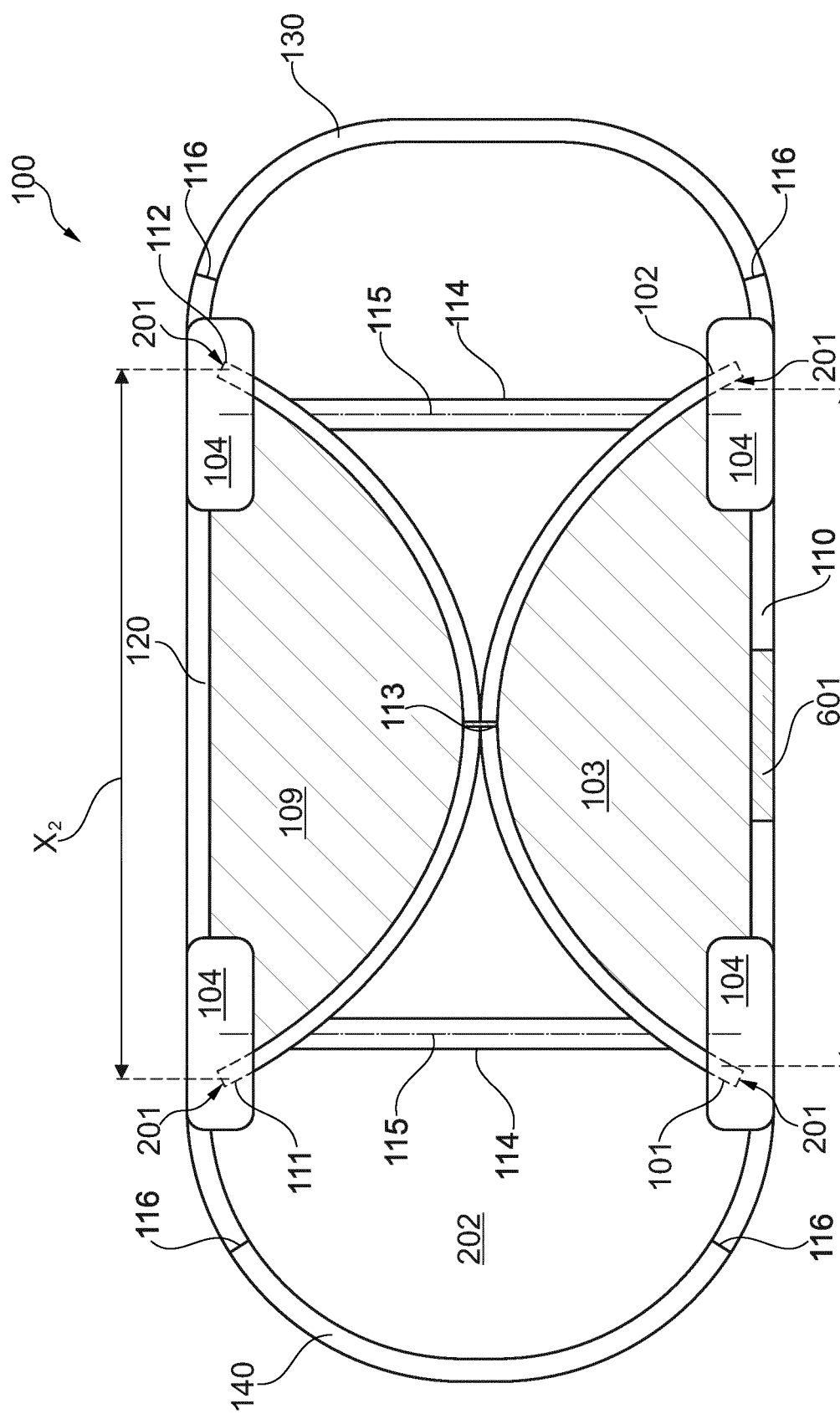
Figure 3:
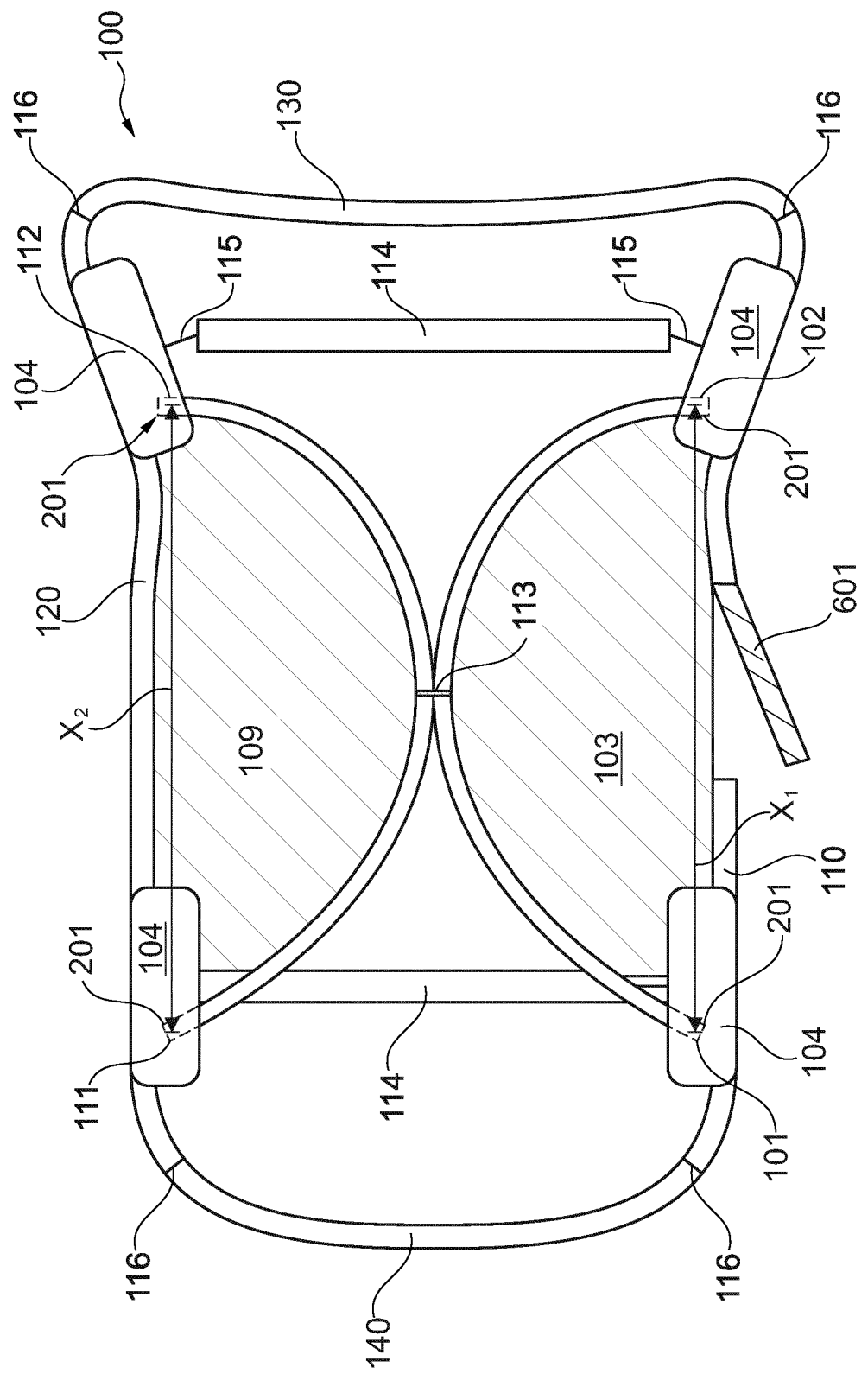
Figure 4:
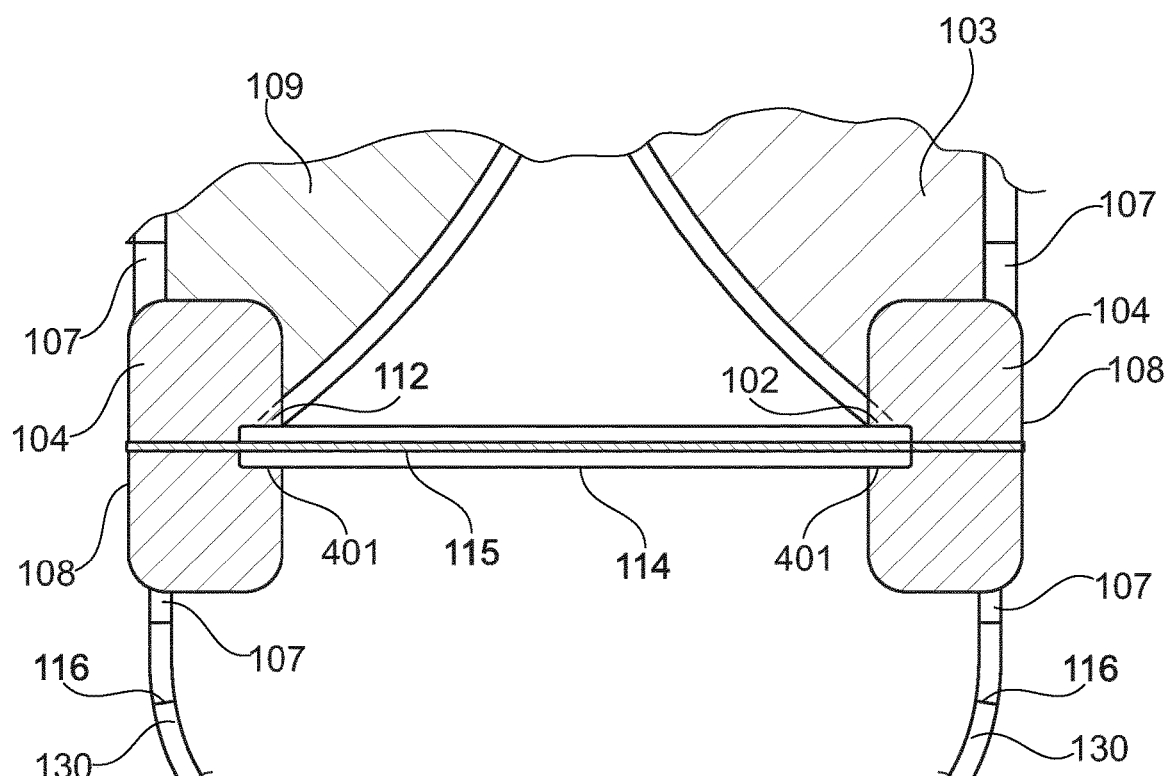
Figure 5:
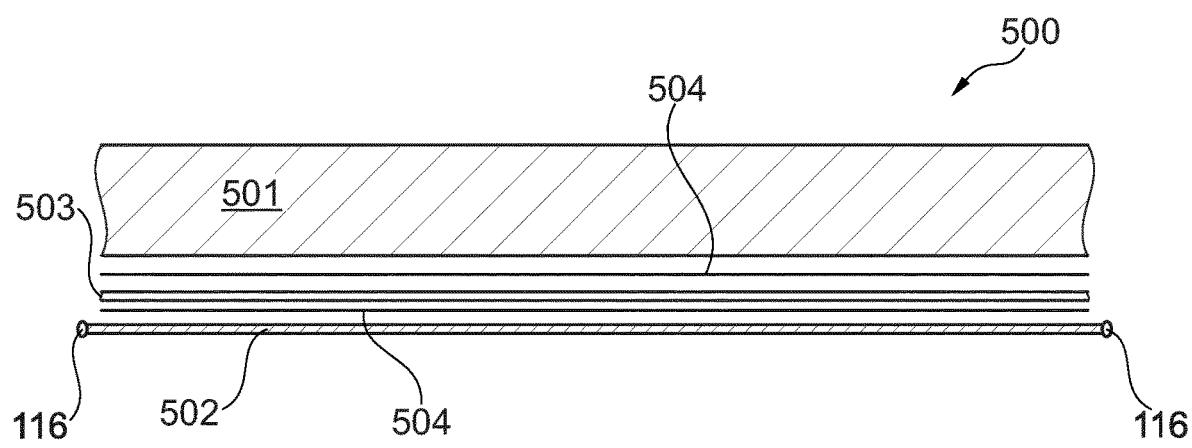
Figure 6:
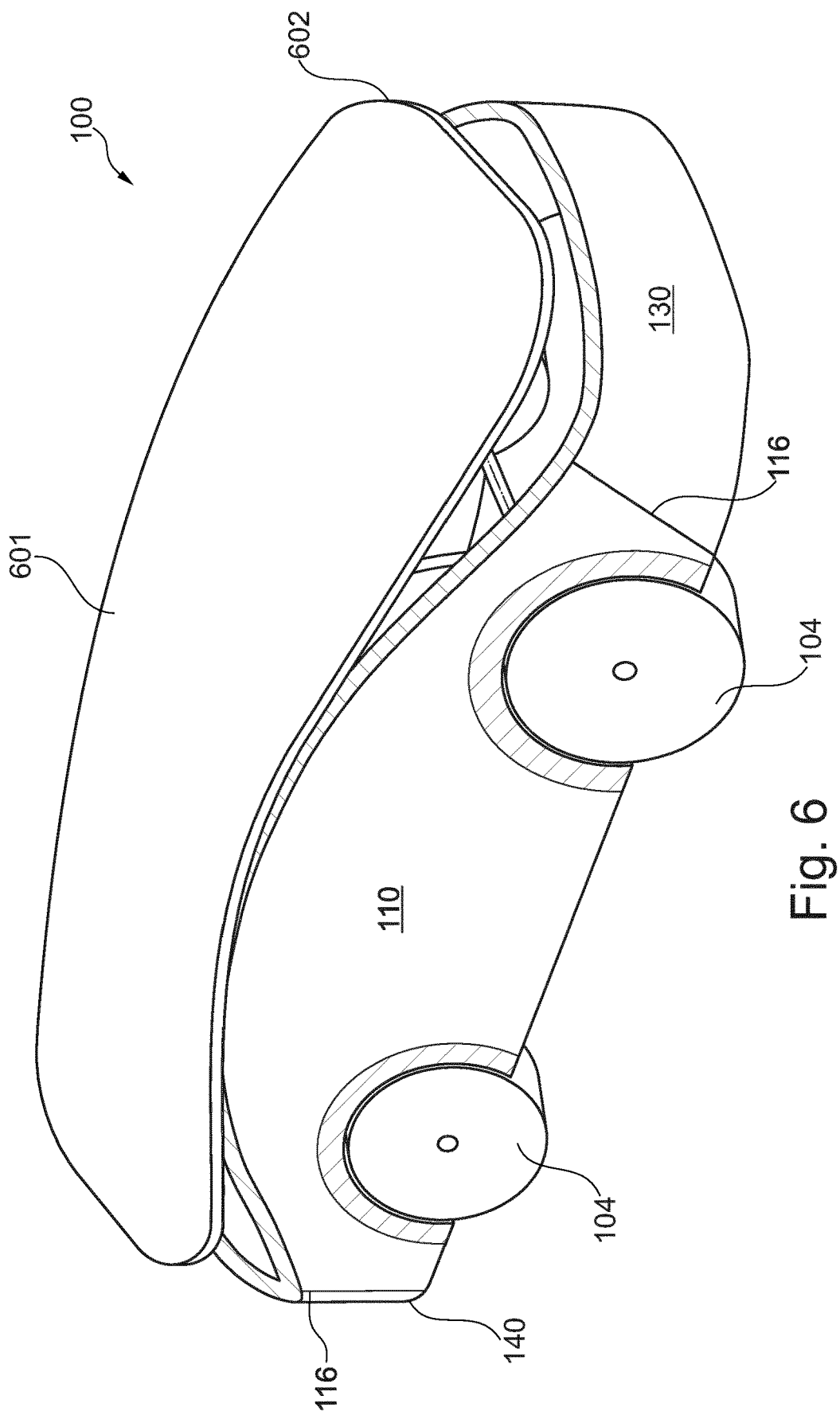
Figure 7:
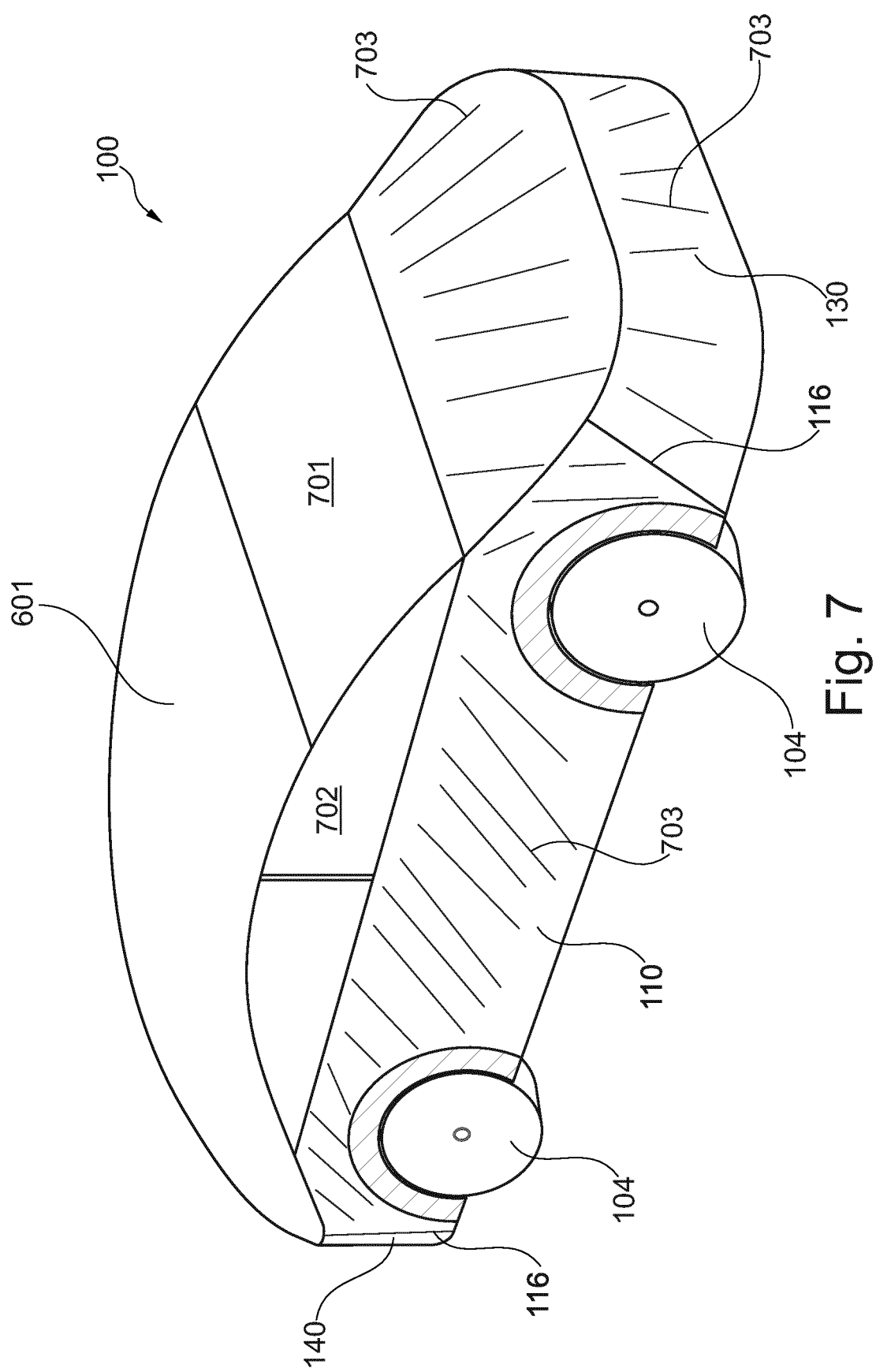
Figure 8:
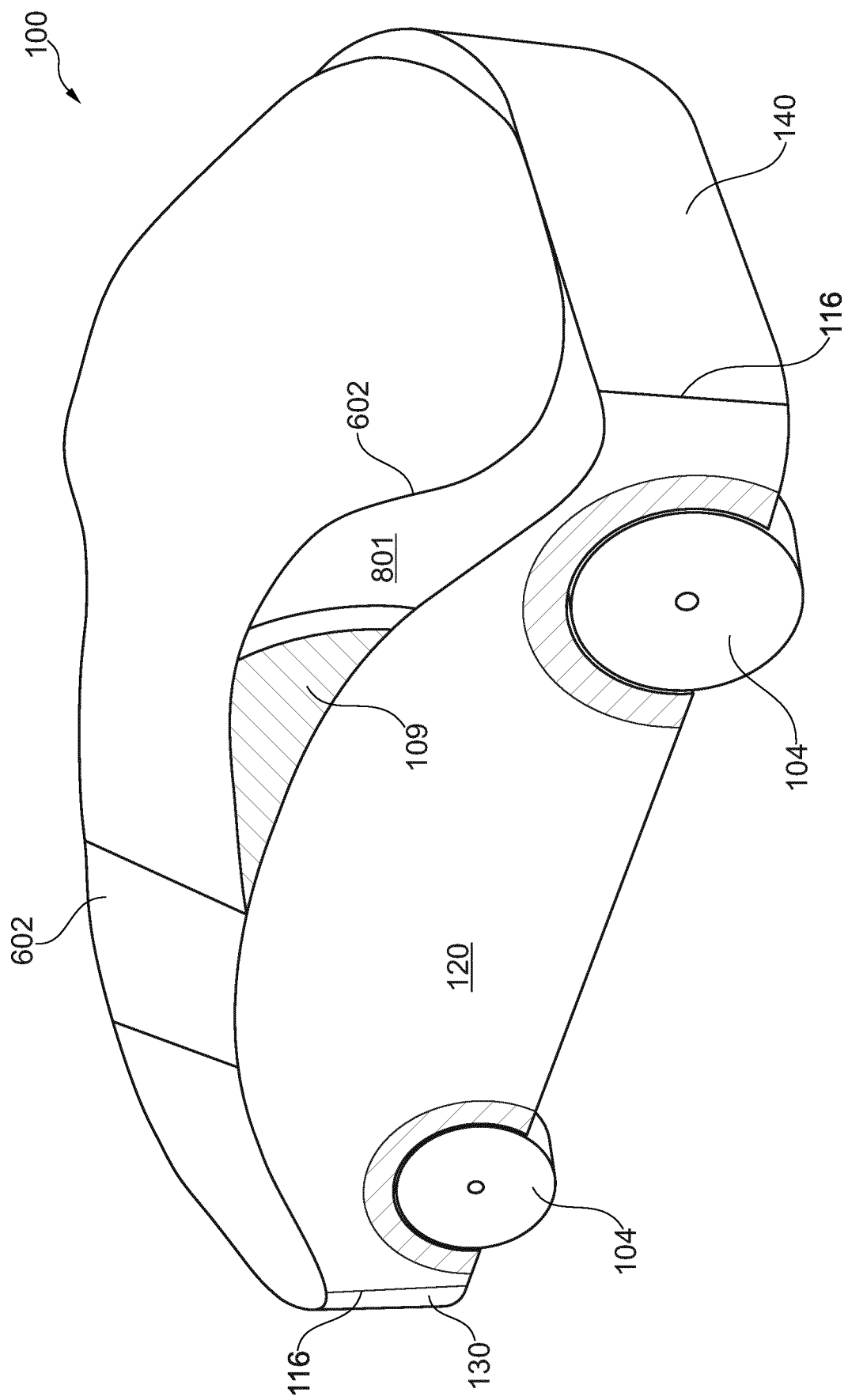

In the following, embodiment examples are described in more detail with reference to the appended drawings for a further explanation and a better understanding of the present invention. In the figures:

FIG. 1 shows a schematic illustration of a dummy vehicle according to an exemplary embodiment without representation of a roof panel, FIG. 2 shows a schematic illustration of a top view on a dummy vehicle according to FIG. 1 in an undeformed state, FIG. 3 shows a schematic illustration of a top view of a dummy vehicle according to FIG. 1 in a deformed state, FIG. 4 shows a magnified illustration of opposing wheel sections, according to an exemplary embodiment of the present invention, FIG. 5 shows a schematic illustration of a layer structure according to an exemplary embodiment of the present invention, FIG. 6 shows a schematic illustration of a dummy vehicle during an attachment of a roof panel, according to an exemplary embodiment of the present invention, FIG. 7 shows a schematic illustration of a dummy vehicle including a roof panel according to an exemplary embodiment of the present invention, and FIG. 8 shows a schematic illustration of the dummy vehicle of FIG. 7 in a deformed state.

DETAILED DESCRIPTION OF EXEMPLARY EMBODIMENTS

Equal or similar components in different figures are provided with same reference numerals. The illustrations in the figures are schematic.

FIG. 1 shows a schematic illustration of a dummy vehicle 100 for carrying out tests for a driver assistance system, according to an exemplary embodiment, without illustration of a roof panel 601 (for this, refer to FIG. 6). The dummy vehicle 100 may have a deformable first outer panel 110, which may at least partially enclose an inner volume of the dummy vehicle 100, and an opening element 601, which may at least partially enclose the inner volume of the dummy vehicle 100, wherein the opening element 601 and the first outer panel 110 may form a self-supporting unit. The opening element 601 may be detachably connected to the first outer panel 110 such that, upon an influence of an impact force, the opening element 601 may be detachable from the first outer panel 110, such that the self-supporting unit may be disintegratable (or can disintegrate or can break up) and a deformation of the vehicle may be providable (or can be undergone).

Furthermore, the dummy vehicle may have an elastically deformable supporting panel 103, which may be arranged in the inner volume of the dummy vehicle 100. The supporting panel 103 may have a first coupling region and a second coupling region 102, which may be spaced at a distance from the first coupling region. The first coupling region 101 and the second coupling region 102 may be coupled to the first outer panel 110, such that the supporting panel 103 may be given in an arched profile shape such that, upon changing of a first distance between the first coupling region 101 and the second coupling region 102, the supporting panel 103 may be preloadable (or can be preloaded).

The dummy vehicle 100 may consist of plural outer panels 110, 120, 130, 140, 601, which together may describe a closed outer shell of the dummy vehicle. The outer panels 110, 120, 130, 140, 601 may enclose an inner volume of the dummy vehicle 100. The outer panels 110, 120, 130, 140, 601 may be formed deformable. This may mean that upon a crash (or an impact) of the dummy vehicle 100 with another test object, the outer panels 110, 120, 130, 140, 601 may be deformed non-destructively. An outer panel 110, 120, 130, 140, 601 may be lacquered (or varnished) on the outer surface, which may 12g oriented in the direction of the surroundings of the dummy vehicle 100, in a desired car colour. In particular, the outer panels 110, 120, 130, 140, 601 may be elastically deformable, and thus may deform back into the starting position after an impact, in which the outer panels 110, 120, 130, 140, 601 may be elastically deformed. Furthermore, the outer panels 110, 120, 130, 140, 601 may have metallic webbing for a simulation close to reality of a car body, in order to simulate the material properties of a metallic car body close to reality. Furthermore, the deformable outer panels 110, 120, 130, 140, 601 may have a sufficient stiffness, such that no vibrating and/or flattering of the outer panels 110, 120, 130, 140, 601 may occur due to a headwind (or fair wind) or due to road irregularities (or bumps) upon movement of the dummy vehicle 100.

The dummy vehicle may have a further elastically deformable supporting panel 109, which may be arranged in an inner volume of the dummy vehicle 100, and a deformable further outer panel 120, which may at least partially enclose the inner volume of the dummy vehicle 100. The further supporting panel 109 may have a further first coupling region 111 and a further second coupling region 112, which may be spaced at a distance from the further first coupling region 111. The further first coupling region 111 and the further second coupling region 112 may be coupled to the second outer panel 120 such that, upon a change of a second distance x2 between the further first coupling region 111 and the further second coupling region 112, the further supporting panel 109 may be preloadable.

The outer panel 110 may form a left half of the car body, and the second outer panel 120 may form a right half of the car body of the dummy vehicle 100.

The supporting panel 103 and the further supporting panel 109 may be attached with each other in a coupling section 113. The coupling section 113 may form a section, in which the supporting panels 103, 109 contact, for example. In this coupling section 113, the supporting panels 103, 109 may be attached to each other, for example, by a rope (or cord) connection.

A deformable third outer panel 130 may enclose at least partially the inner volume of the dummy vehicle 100. The third outer panel 130 may be connected to the first outer panel 110 and the second outer panel 120, wherein the third outer panel 130 may form a front area of the dummy vehicle 100.

A deformable fourth outer panel 140 may at least partially enclose the inner volume of the dummy vehicle 100. The fourth outer panel 140 may be connected to the first outer panel 110 and the second outer panel 120, wherein the fourth outer panel 140 may form in particular a rear area of the dummy vehicle 100.

The elastically deformable supporting panels 103, 109 may be fixed to an according outer panel 110, 120. At this time, the supporting panel 103 may be fixed to the outer panel 110 by a first coupling region 101 and a second coupling region 102 that may be spaced at a distance x1. The first coupling region 101 and the second coupling region 102 of the elastically deformable supporting panel 103 may form, for example, edge regions of the supporting panel 103.

The supporting panels 103, 109 and the outer panels 110, 120, 130, 140 may be formed self-supportingly. In particular, the outer panels 110, 120, 130, 140 and the supporting panels 103, 109 may be formed stiffly such that these may form, in the mutual composition, a self-supporting unit, i.e. the dummy vehicle 100. The dummy vehicle 100 may for example be beared on the ground, without leading to further deformations. In other words, in particular in an unloaded state, in which the dummy vehicle 100 may bear on the ground, the first distance and/or generally the distances x1, x2 between the coupling regions 101, 102, 111, 112 may remain constant. At this time, the supporting panel 103, 109 may be a plane element.

The first coupling region 101 and the second coupling region 102 may be coupled to the first outer panel 110 such that, upon being given the first distance x1, the supporting panel may be given in an arched profile shape. Accordingly, for a distance x2, the further supporting panel 109 may be given in an arched profile shape.

The outer panels 110, 120 may be connected, for example, with connection means 116. In a preferred embodiment, these connection means 116 may be attached at edge regions of the outer layer 502 (see FIG. 5).

The first outer panel 110 and the second outer panel 120 may have wheel sections 104. A wheel section 104 may have a round running notch 107, which may delimit a wheel section 104 e.g. of the first outer panel 110 from a section of the first outer panel 110 that may enclose the wheel section 104.

The wheel section 104 thus may delimit itself from the surrounding section of the outer panel 110, 120 by the notch 107. The wheel section 104 may represent an integral component part of the outer panel 110, 120, and may be produced, for example, by milling the notch 107. Alternatively, the wheel section 104 may represent a separate element, and may be fixed to the outer panel 110, 120. One wheel section 104 or a plurality of wheel sections 104 may be formed at a corresponding outer panel 110, 120.

The wheel section has a peripheral surface 105 and the enclosing section may have a confining surface 106. The peripheral surface 105 and the confining surface 106 may be facing each other and may be, spaced at a distance from each other by the notch 107. The confining surface 106 may have in particular a metallic surface layer, and the peripheral surface 105 may have in particular a light-absorbing surface layer, in particular a rubberized surface layer. The confining surface 106 of the outer panel 110, 120 thus may form a wheel housing of the dummy vehicle 100. The peripheral surface 105 thus may form the tyre surface of the wheel section 104.

The wheel section 104 has an outer surface 108, wherein the outer surface 108 may have a further metallic surface layer. The further metallic surface layer may have a pattern, in particular indicative for an arrangement of wheel rim spokes. The outer surface 108 may in particular be that surface, which may adjoin the peripheral surface 105 of the wheel section 104. The outer surface 108 may have a radially outer edge region, which may have a light-absorbing material, in particular a rubberized layer. In the center of the outer surface 108, which may be enclosed by the radial outer edge region, for example the metallic surface layer may be formed. The pattern of the metallic surface layer may be indicative for a spoke pattern of a real wheel rim. In particular, the center of the outer surface 108 may be embodied by a replaceable metal cylinder, which may form, for example, a wheel rim of a dummy vehicle.

The wheel section may be formed rotatably relative to the outer panel 110, 120.

The dummy vehicle 100 may further have a reinforcement bar 114, wherein the reinforcement bar 114 may be fixed between the first outer panel 110 and the second outer panel 120 such that a pressure force may be transferable to the reinforcement bar. The reinforcement bar 114 may thus ensure a minimum distance between two outer panels 110, 120. Furthermore, the reinforcement bar 114 may serve for stiffening the dummy vehicle, such that this may be more robust and may form a self-supporting unit.

The reinforcement bar 114 may be arranged between two opposing wheel sections 104 of oppositely arranged outer panels 110, 120.

The first outer panel 110 and the second outer panel 120 may have a receiving opening 400 (see FIG. 4), into which the reinforcement bar 114 may be detachably insertable.

The dummy vehicle 100 may further have a tie element (or pull element) 115, in particular an elastic tie element, wherein the tie element may be fixed to the first outer panel 110 and/or the second outer panel 120 and the reinforcement bar 114 such that the tie element 115 may transfer tensile forces between the first outer panel 110 and/or the second outer panel 120 on the one hand and the reinforcement bar 114 on the other hand.

Furthermore, functional elements 117, such as for example an exterior mirror, a licence plate mount, or a headlamp, may be attached on the outer surface of the outer panels 110, 120, 130, 140, for example glued thereon. In an exemplary embodiment, for example upon a deceleration and/or during a braking of the dummy vehicle 100, a backup lamp may shine in order to thus simulate a brake light.

FIG. 2 is a schematic illustration of a top view on a dummy vehicle 100 according to FIG. 1 in an undeformed state, and FIG. 3 is a schematic illustration of a top view on a dummy vehicle according to FIG. 1 in a deformed state, in which the opening element 601 is opened.

Upon an impact of the dummy vehicle 100, a high impact energy may act on the outer panels 110, 120, 130, 140. These may begin to deform, in order to absorb the shock of collision on the one hand and in order to simulate a realistic collision with real vehicles on the other hand. Due to the deformation of the outer panels 110, 120, 130, 140, the distances between the first coupling regions 101, 111 and the second coupling regions 102, 112 (see FIG. 3) may change (i.e. the distances x1, x2 are prolongated or shortened). This in turn may result in a preload of the elastic supporting panels 103, 109. After the impact, the supporting panel 103, 109 may deform back into its starting position, and may push or may pull the first coupling region 101, 111 and the second coupling region 102, 112 in the original shape, such that the first distance x1 between the first coupling region 101, 111 and the second coupling region 102, 112 may be given again. At this time, the outer panel 110, 120 may be brought into its original shape again and for example loaded (or strained) anew.

The opening element 601 may in particular be detachably connected to the first outer panel such that, upon increase of an air pressure in the inner volume or due to a mechanical deformation due to an impact force of the dummy vehicle, the opening element 601 may be detachable from the first outer panel 110, such that a pressure equalization between the inner volume and the surroundings of the dummy vehicle may be providable (see FIG. 3).

Due to the deformation of the dummy vehicle 100 after an impact, the opening element 601 may open and thus may disintegrate the self-supporting structure of the dummy vehicle 100. By disintegrating the self-supporting structure, the individual components of the dummy vehicle 100, such as for example the outer panels 110, 120, 130, 140 and the opening elements 601, may be movable (deformable) relative to each other. In particular, after the disintegration of the self-supporting structure, the outer panels 110, 120, 130, 140 may remain connected to each other, and may deform relatively to each other due to a flexible connection. The opening element 601 may, after the opening, remain attached to a region on the corresponding outer panel.

As long as the self-supporting structure consisting of the outer panels 110, 120, 130, 140 and the opening elements 601 is closed, the dummy vehicle may be dimensionally stable (or inherently stable) and e.g. wind-resistant. Due to the collision energy, the force for the overpressure may result in an opening of the opening element 601, and the structure may become weak.

The first outer panel 110 (and correspondingly the second outer panel 120) may have a connection device 201, in which the first coupling region 101, 111 or the second coupling region 102, 112 may be attachable. The connection device 201 may, for example, represent a detachable connection device 201. The connection device 201 may be embodied in the present example as a receiving opening, in particular as a slit, in the outer panels 110, 120, such that the first coupling region 101, 111 or the second coupling region 102, 112 may be insertable into the receiving opening. An edge of the supporting panel 103, 109 may form a coupling region 101, 111, 102, 112. This edge may, for example, be inserted into the slit, which may be formed in the outer panel 110, 120. The slit may have in particular an extension direction into the outer panel 110, 120, which extension direction may not run parallel to a distance direction, along which the first distance x1 or the second distance x2 may be measured. This may result in that upon changes, in particular upon an increase, of the distances x1, x2 of the corresponding coupling regions 101, 111, 102, 112, the supporting panel 103, 109 and/or their coupling region 101, 111, 102, 112 may not be pulled out of the slit (see FIG. 3). Upon a change of the distance x1, x2, thus an according deformation force may be transferred from the outer panel 110, 120 to the coupling region 101, 111, 102, 112, and accordingly may be transferred to the supporting panel 103, 109.

The supporting panels 103, 109 may have a bearing region for bearing on a ground 202, wherein the bearing region may be embodied such that a gravitational force of the outer panels 110, 120, 130, 140 and the supporting panels 103, 109 may be transferable onto the ground 202. In particular, the outer panels 110, 120, 130, 140 may be embodied such that, upon bearing of the supporting panels 103, 109 on the ground, the outer panels 110, 120, 130, 140 may be free from a force transmitting coupling to the ground.

It is furthermore shown in FIG. 3, that in a deformed state of the dummy vehicle 100, the reinforcement bar 114 may be detached from the outer panels 110, 120 and may be connected to the outer panels 110, 120 exclusively via the tie element 115.

FIG. 4 shows a magnified illustration of opposing wheel sections 104 according to the dummy vehicle of FIG. 1 to FIG. 3. The first outer panel 110 or the second outer panel 120 may have a receiving opening, into which the reinforcement bar 114 may be detachably insertable. Herein, the receiving opening 114 may be formed such that the reinforcement bar 114 may be inserted thereinto and may abut at a certain depth of the receiving opening, for example on an abutment. If the outer panels 110, 120 detach from each other due to an impact (see e.g. FIG. 3) and/or if the distance between the two outer panels 110, 120 increases, then the reinforcement bar 114 may slide out of the receiving opening, and an according further deformation of the outer panels 110, 120 may be enabled.

The reinforcement bar 114 may be formed, for example, as a hollow profile, wherein the tie element 115 may run in the interior of the hollow profile. The tie element 115 may represent for example an elastic rope, such as for example an elastic expander. Thus, for example the outer panels 110, 120 may depart from the reinforcement bar 114 upon an impact, such that the reinforcement bar 114 may detach from the corresponding outer panel 110, 120, however a remaining connection between the reinforcement bar 114 and the outer panel 110, 120 may be ensured via the tie element 115.

FIG. 5 shows a schematic illustration of a layer structure 500 according to an exemplary embodiment of the present invention. An outer panel 110, 120, 130, 140 may be formed e.g. of a layer structure 500. The layer structure 500 may have in particular a deformable foam rubber layer 501, which may at least partially enclose the inner volume of the dummy vehicle 100 with an inner side. In addition or alternatively, the layer structure 500 may have in particular a deformable outer layer 502, which may be attached at an outer side of the foam rubber layer 501 opposite to the inner side. The deformable outer layer 502 may be in particular non-transparent and may absorb impinging light waves. Furthermore, the foam rubber layer 501 may be formed deformable. In an exemplary embodiment, the foam rubber layer 501 may be in particular elastically deformable.

Adhesive layers 503 may be arranged between the foam rubber layer 501 and the outer layer 502 and/or a functional layer 503. The adhesive layer 503 may be formed for example of an adhesive foil, which may have, for example, a layer thickness of about 50 µm (micrometer) to about 0.25 mm (millimeter).

The layer structure 500 may further have a deformable functional layer 503 between the foam rubber layer 501 and the outer layer 502. The functional layer 503 may have in particular a heatable layer, a layer of metal components, in particular of metallic web, and/or an infrared light reflecting layer.

If the functional layer 503 may be embodied heatable, the operation of an engine and/or its heat irradiation may be simulated, for example, in the area of an engine compartment of the dummy vehicle 100. If a metallic web is inserted as the functional layer 503 in the layer structure 500, the radar reflectivity may thus be improved, such that radar sensors of the driver assistance system may be tested. Correspondingly, infrared sensors of the driver assistance system may be tested, if the functional layer 503 has an infrared light reflecting layer. A layer structure 500 may have, for example, one functional layer 503 or a plurality of functional layers 503.

FIG. 6 shows a schematic illustration of a dummy vehicle 100 according to FIG. 1 during an attachment of an opening element as a roof panel 601, according to an exemplary embodiment of the present invention. The dummy vehicle 100 may have a panel, in particular a roof panel 601, which may be detachably connected to the first outer panel 110 (and/or an arbitrary other outer panel 120, 130, 140) such that, upon an increase of an air pressure in the inner volume of the dummy vehicle 100, the roof panel may be detachable from at least one of the outer panels 110, 120, 130, 140.

The roof panel 601 may be coupled by a further connection means 602, for example a hook-and-loop fastener, a safety slide fastener, a button connection and/or a hook connection. Thus, a targeted specified opening with the further connection means 602 may be integrated, such that upon presence of a particular pressure in the inner volume of the dummy vehicle 100, the further connection means 602 may be released.

FIG. 7 shows a schematic illustration of a dummy vehicle 100 of FIG. 1 including a roof panel 601 in an undeformed state, and FIG. 8 shows a schematic illustration of a dummy vehicle 100 of FIG. 1 including a roof panel 601 in a deformed state. Due to the deformation of the dummy vehicle 100 after a crash, the inner volume of the dummy vehicle 100 may change, such that an overpressure or an underpressure may result, which may destroy components of the dummy vehicle. In addition, an according underpressure or overpressure may falsify the simulation results. For this reason, the roof panel 601 may be detachably coupled to the outer panels 110, 120, 130, 140, so that such an opening and/or an air gap 801 may be provided. Upon exceeding an overpressure of, for example, more than 1.5 bar, the roof panel 601 may detache, so that a pressure equalization connection 801 may be present between the inner volume and the surroundings of the dummy vehicle 100. Thus, in particular damages due to unfavorable pressure conditions in the inner volume may be, reduced. The panel 601 may, beside a roof panel, which may form a roof of a dummy vehicle 100, also form a bottom panel or a side panel 110, 120, 130, 140 of the dummy vehicle 100. The roof panel 601 may also be detachably connected to the supporting panels 103, 109.

The roof panel 601 may be coupled such that in a closed state, in which the roof panel 601 and the outer panel 110, 120 may prevent a pressure equalization between the inner volume and the surroundings of the dummy vehicle 100, the outer panel 110, 120 and the roof panel 601 may form a self-supporting structure (FIG. 7), and that in an open state, in which the roof panel 601 and the outer panel 110, 120 may provide a pressure equalization between the inner volume and the surroundings of the dummy vehicle 100 (FIG. 8), the outer panel 110, 120 and the roof panel 601 may form a deformable structure.

Furthermore, FIG. 7 shows different regions 701, 702, 703 of the panels 110, 120, 130, 140, 601, which may have different functional regions. For example, the roof panel may have a wind shield region 701. The wind shield region 701 may, for example in comparison to the opaque surrounding regions, have a light lucent and transparent region. This may enable a realistic simulation of a dummy vehicle on the one hand. Furthermore, for example GPS signals of a positioning system, which can be arranged in the inner volume of the dummy vehicle 100, may thus be transmitted free from interference from the inner volume of the dummy vehicle 100 to the outside. Accordingly, for example, the first outer panel 110 may have a side window region 702.

Furthermore, radar reflector regions 703 of the panels 110, 120, 130, 140, 601 may be formed with a metallic layer and/or with a metallic web in order to thus simulate the metallic body of a dummy vehicle. This may serve in particular for a realistic reflection of radar beams.

The panels may be formed, for example, with the layer structure 500. As a function of its functionality, the layer structure 500 may be adapted locally in order to provide the corresponding functionalities of the regions 701, 702, 703.

Supplementarily, it is to be noted that "having" (or "comprising") does not exclude other elements or steps, and "a" or "an" do not exclude a plurality.

Furthermore, it is to be noted that features or steps, which have been described with reference to one of the embodiment examples described above can also be used in combination with other features or steps of other embodiment examples described above. Reference numerals in the claims are not to be considered as limitations.

LIST OF REFERENCE NUMERALS 100 dummy vehicle
101 first coupling region
102 second coupling region
103 supporting panel
104 wheel section
105 peripheral surface
106 confining surface
107 notch
108 outer surface
109 further supporting panel
110 first outer panel
111 first coupling region
112 second coupling region
113 coupling section
114 reinforcement bar
115 tie element
116 connection means
117 functional element
201 connection device
202 bottom region
500 layer structure
501 foam rubber layer
502 outer layer
503 functional layer
504 adhesive layer
601 opening element/roof panel
602 further connection means
701 wind shield region
702 side window region 703 radar reflector region
801 air gap
x1 first distance
x2 second distance

The invention claimed is:

1. Dummy vehicle for carrying out tests for a driver assistance system, the dummy vehicle having
a deformable first outer panel, which at least partially encloses an inner volume of the dummy vehicle, and
an opening element, which at least partially encloses the inner volume of the dummy vehicle,
wherein the opening element and the first outer panel form a self-supporting unit,
wherein the opening element is detachably connected to the first outer panel such that, upon an influence of an impact force, the opening element is detachable from the first outer panel, such that the self-supporting unit is disintegratable and a deformation of the vehicle is providable.

2. Dummy vehicle according to claim 1,
wherein the opening element is detachably connected to the first outer panel such that, upon an increase of an air pressure in the inner volume or due to a mechanical deformation due to an impact force of the dummy vehicle, the opening element is detachable from the first outer panel, such that a pressure equalization between the inner volume and the surroundings of the dummy vehicle is providable.

3. Dummy vehicle according to claim 1,
wherein the opening element forms a panel, in particular a roof panel,
in particular
wherein the outer panel and the panel, in particular the roof panel are coupled, such that
in a closed state, in which the panel and the outer panel prevent a pressure equalization between the inner volume and the surroundings of the dummy vehicle, the outer panel and the panel form a self-supporting structure, and
in an open state, in which the panel and the outer panel provide a pressure equalization between the inner volume and the surroundings of the dummy vehicle, the outer panel and the panel form a deformable structure.

4. Dummy vehicle according to claim 1,
wherein the opening element is detachably attached to a safety slide fastener.

5. Dummy vehicle according to claim 1,
wherein the opening element is detachably attached to the first outer panel with a hook-and-loop fastener, a button connection and/or a hook connection.

6. Dummy vehicle according to claim 5,
wherein the first coupling region and/or the second coupling region have a greater panel thickness than a panel region of the supporting panel [located] between the first coupling region and the second coupling region.

7. Dummy vehicle according to claim 1, further having
an elastically formable supporting panel, which is arranged in the inner volume of the dummy vehicle,
wherein the supporting panel has a first coupling region and a second coupling region that is spaced at a distance from the first coupling region,
wherein the first coupling region and the second coupling region are coupled to the first outer panel such that, upon changing of a first distance, x1, between the first coupling region and the second coupling region, the supporting panel is preloadable,
in particular
wherein the first coupling region and the second coupling region are coupled to the first outer panel such that, upon being given the first distance, x1, the supporting panel is given in an arched profile shape and/or
wherein the first outer panel has a connection device, in which the first coupling region or the second coupling region is attachable,
more in particular
wherein the connection device is configured as a receiving opening, in particular as a slit, in the first outer panel such that the first coupling region or the second coupling region is insertable into the receiving opening.

8. Dummy vehicle according to claim 7,
wherein the supporting panel is formed such that, upon being given the first distance, x1, the supporting panel is preloaded.

9. Dummy vehicle according to claim 7,
wherein the supporting panel has a bearing region for bearing on the ground,
wherein the bearing region is formed such that a gravitational force of the first outer panel and the supporting panel is transferable onto the ground,
wherein in particular the first outer panel is formed such that, upon bearing of the supporting panel on the ground, the first outer panel is free from a force-transmitting coupling to the ground.

10. Dummy vehicle according to claim 7,
wherein the outer panel is formed of a laminar structure,
wherein the laminar structure has in particular a deformable foam rubber layer, which, with an inner side, at least partially encloses the inner volume of the dummy vehicle, and/or
wherein the laminar structure has in particular a deformable outer layer, which is attached on an outer side of the foam rubber layer (501) being opposite to the inner side,
wherein the deformable outer layer is in particular non-transparent,
in particular
wherein the foam rubber layer has a thickness ranging from 20 mm to 100 mm, and
wherein the foam rubber layer has a density ranging from 15 kg/m$^3$ to 60 kg/m$^3$,
alternatively or additionally in particular
wherein an adhesive layer is arranged between the foam rubber layer and the outer layer,
still alternatively or additionally in particular
wherein the outer layer has a reflection coefficient between 60% and 80% with respect to light having a spectral range ranging from 700 nm to 900 nm, in particular infrared light,
still further alternatively or additionally in particular
wherein the layer structure further has a deformable functional layer between the foam rubber layer and the outer layer,
wherein the functional layer has in particular a heatable layer, a layer of metal components, in particular of metallic web, and/or an infrared light reflecting layer.

11. Dummy vehicle according to claim 1,
wherein the first outer panel has a wheel section,
wherein the wheel section has a round running notch, which confines a wheel section of the first outer panel from a section of the first outer panel, which section encloses the wheel section,
in particular
wherein the wheel section has a peripheral surface and the enclosing section has a confining surface, wherein the peripheral surface and the confining surface face each other and are spaced at a distance from each other by the notch, wherein the confining surface has in particular a metallic surface layer and the peripheral surface has in particular a light-absorbing surface layer, in particular a rubberized surface layer, alternatively or additionally in particular wherein the wheel section has an outer surface, wherein the outer surface has a further metallic surface layer, wherein the further metallic surface layer has a pattern, in particular indicative for an arrangement of wheel rim spokes, further alternatively or additionally in particular wherein the wheel section is formed rotatably relative to the first outer panel.

12. Dummy vehicle according to claim 1, further comprising a deformable second outer panel, which at least partially encloses the inner volume of the dummy vehicle, wherein the opening element, the first outer panel and the second outer panel form the self-supporting unit, wherein the opening element is detachably connected to the second outer panel such that, upon an influence of an impact force, the opening element is detachable from the second outer panel, such that the self-supporting unit is disintegratable and a deformation of the vehicle is providable.

13. Dummy vehicle according to claim 12, further having a further elastically deformable supporting panel, which is arranged in the inner volume of the dummy vehicle, wherein the further supporting panel has a further first coupling region and a further second coupling region that is spaced at a distance from the further first coupling region, wherein the further first coupling region and the further second coupling region are coupled to the second outer panel such that the further supporting panel is given in a further arched profile shape, such that upon changing of a second distance, $x2$, between the further first coupling region and the further second coupling region, the further supporting panel is reloadable.

14. Dummy vehicle according to claim 13, wherein the supporting panel and the further supporting panel are fixed to each other in a coupling section.

15. Dummy vehicle according to claim 13, further having a reinforcement bar, wherein the reinforcement bar is fixed between the first outer panel and the second outer panel such that a pressure force is transferrable to the reinforcement bar.

16. Dummy vehicle according to claim 15, wherein at least the first outer panel or the second outer panel has a receiving opening, into which the reinforcement bar is detachably insertable.

17. Dummy vehicle according to claim 15, further having a tie element, in particular an elastic tie element, wherein the tie element is attached to the first outer panel and/or the second outer panel and the reinforcement bar such that the tie element transfers tensile forces between the first outer panel and/or the second outer panel and the reinforcement bar.

18. Dummy vehicle according to claim 12, further having a deformable third outer panel, which at least partially encloses the inner volume of the dummy vehicle, wherein the third outer panel is connected to the first outer panel and the second outer panel, wherein the third outer panel forms in particular a front region of the dummy vehicle and/or wherein the dummy vehicle further has a deformable fourth outer panel, which at least partially encloses the inner volume of the dummy vehicle, wherein the fourth outer panel is connected to the first outer panel and the second outer panel, wherein the fourth outer panel forms in particular a rear region of the dummy vehicle.

19. Method for carrying out tests for a driver assistance system using a dummy vehicle according to claim 1.

* * * * *